June 25, 1946.   R. J. OLANDER   2,402,571
SHOCK ABSORBER
Filed Sept. 27, 1943
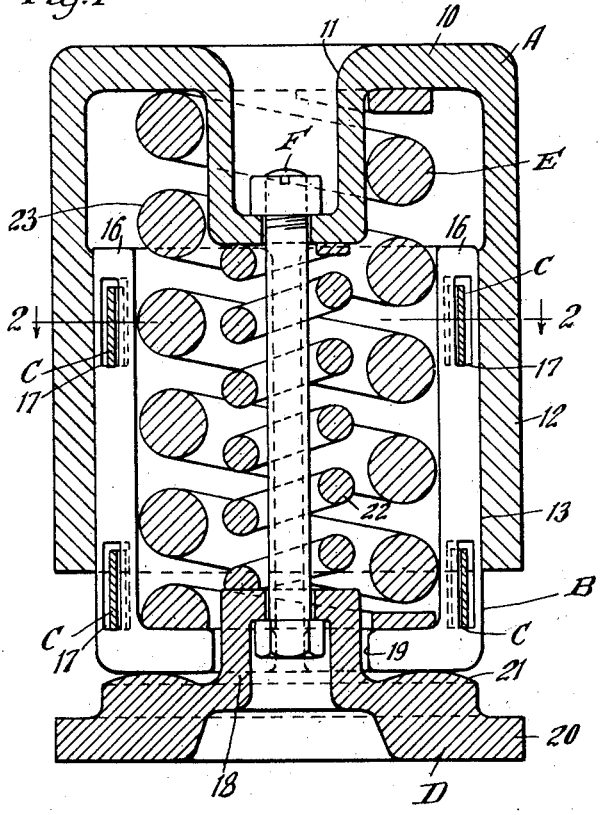
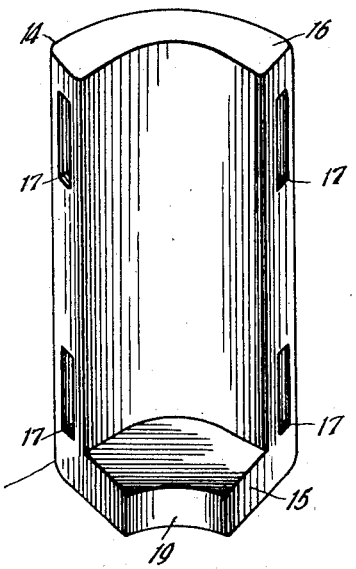
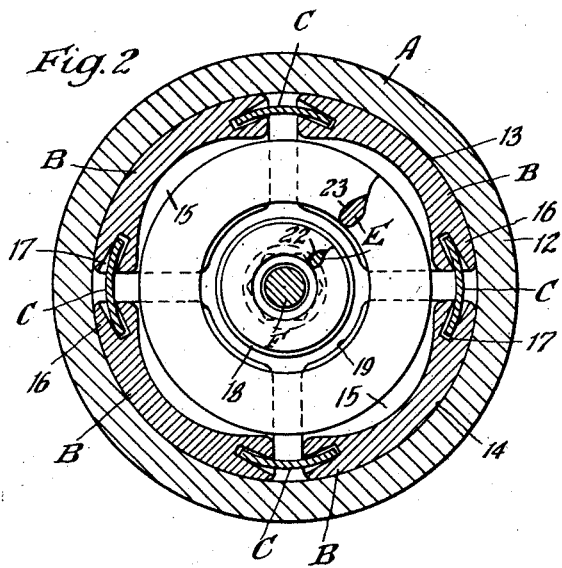
Inventor
Roland J. Olander
By Henry Fuchs
Atty.

Patented June 25, 1946

2,402,571

UNITED STATES PATENT OFFICE 2,402,571

SHOCK ABSORBER

Roland J. Olander, Chicago, Ill., assignor to W. H. Miner, Inc., Chicago, Ill., a corporation of Delaware Application September 27, 1943, Serial No. 503,873

6 Claims. (Cl. 267—9)

This invention relates to improvements in shock absorbers, especially adapted for use as snubbing devices in connection with truck springs of railways cars.

One object of the invention is to provide a friction shock absorber functioning as a snubbing device for truck springs of railway cars providing substantially uniform resistance during the actuation thereof, wherein the uniform resistance is produced by a friction shell and relatively movable friction shoes arranged in circular series and having frictional sliding engagement with the interior walls of the shell, the shoes being urged into frictional engagement with the walls of the shell by resilient bowed spring plates connecting adjacent shoes and yieldingly pressing said shoes outwardly.

Another object of the invention is to provide a shock absorber comprising a cylindrical friction casing having transversely curved, interior friction surfaces, and a spring resisted, expandible friction unit slidable within the casing, wherein the friction unit comprises a plurality of transversely curved friction shoes having sliding engagement with the friction surfaces of the casing, and transversely bowed, resilient spring plates connecting the shoes, the resiliency of the plates tending to hold the friction unit expanded to maintain the shoes in tight frictional contact with the friction surfaces of the casing.

Other objects of the invention will more clearly appear from the description and claims hereinafter following.

In the drawing forming a part of this specification, Figure 1 is a transverse, vertical, sectional view of my improved shock absorber, said view being in a plane coincident with the central, vertical axis of the device. Figure 2 is a horizontal, sectional view, corresponding substantially to the line 2—2 of Figure 1. Figure 3 is a perspective view of a friction shoe member employed in my improved mechanism.

As shown in the drawing, my improved shock absorber or snubber comprises broadly a casing A; four friction shoes B; eight bowed spring plates C; a follower D; spring resistance means E; and a retainer bolt F.

The casing A is in the form of a substantially cylindrical, tubular member, open at the bottom and closed at the upper end by a transverse top wall 10 provided with a depending central hollow boss 11. At the lower end, the vertical wall portions of the cylinder A are thickened, as indicated at 12, said cylinder at said thickened wall portion presenting a cylindrical, interior friction surface 13 extending lengthwise of the casing.

The friction shoes B, which are preferably four in number, are of like design, each shoe being in the form of a relatively heavy, transversely curved, platelike section presenting an outer, cylindrical, friction surface 14 fitting the interior, cylindrical friction surface 13 of the casing. At the bottom end, each shoe B has a laterally, inwardly projecting, horizontal flange 15. As shown most clearly in Figure 2, at the vertical side end portions thereof, each shoe is thickened, as indicated by 16. Adjacent the top and bottom ends of each shoe, the thickened side end portions are provided with seats 17—17—17—17 adapted to receive the ends of the spring plates C. The spring plates C—C are of rectangular outline and are transversely bowed, as clearly shown in Figure 2.

The four friction shoes are arranged in annular series, in the assembled condition of the parts, and are connected by the spring plates C—C which have their opposite ends seated in the aligned seats 17—17 of adjacent shoes. The shoes B—B, together with the spring plates C—C, thus form an expandible friction unit of substantially cylindrical shape, fitting the interior of the friction casing. With the shoes in telescoped relation within the casing A, as shown in Figures 1 and 2, the spring plates C—C press the shoes outwardly against the interior friction surfaces of said casing, the spring plates being in flexed condition in the assembled state of the device, their tendency to straighten out holding the unit expanded.

The follower D is in the form of a relatively heavy disc provided with an upstanding, central, hollow boss 18 extending between the shoes B—B at the bottom ends thereof. As shown most clearly in Figure 3, the inner end portion of the flange 15 of each shoe is cut out, as indicated at 19, to clear the boss 18 of the follower D. The follower disc D is reduced in thickness, at the periphery thereof, as indicated at 20, thereby providing a central raised portion 21 adapted to be received within the open end of the casing when the mechanism is fully compressed. The reduced portion 20 forms, in effect, a circular flange which serves as an abutment for the end of the casing A to arrest downward movement of said casing and limit compression of the mechanism.

The spring resistance E comprises an inner, relatively light coil 22 and a heavier outer coil 23, the inner coil having its opposite ends bearing respectively on the hollow bosses 11 and 18 of the casing A and follower D, and the outer coil having its opposite ends bearing respectively on the inner side of the top wall 10 of the casing A and the flanges 15—15 of the shoes B—B.

The parts of the device are held assembled by the retainer bolt F which has its opposite ends anchored respectively in the hollow bosses 11 and 18 of the casing A and follower D.

As is well known to those skilled in this art, my improved shock absorber or snubber replaces one or more of the spring units of a cluster of truck springs of a railway car and serves to dampen the action of the truck springs. When assembled with the truck spring cluster, my improved shock absorber is held centered by the usual projections of the top and bottom truck spring plates extending into the recesses provided by the hollow bosses 11 and 18 of the casing A and follower plate D.

Figure 1 shows the normal expanded condition of the shock absorber or snubber. In the operation of my improved shock absorbing snubber, assuming the parts to be in the position shown in Figure 1, upon the spring cluster of the truck of the railway car being compressed between the spring follower plates, the casing A and follower D will be forced toward each other, thereby forcing the shoes B—B inwardly of the casing opposed by the spring resistance E. Frictional resistance is thus provided by sliding movement of the shoes on the interior friction surfaces of the casing, thereby providing the required resistance to snub the action of the truck springs and reduce the oscillations of said springs to the desired minimum. Upon expansion of the coils of the truck springs, the spring followers are moved apart and the casing A and follower D, together with the shoes B—B, will be moved away from each other by the expansive action of the spring resistance E, thereby restoring the parts to the normal position shown in Figure 1.

I claim:

1. In a shock absorber, the combination with a friction casing having interior, longitudinally extending friction surfaces; of a sectional, expandible friction unit telescoped within the casing and having sliding frictional engagement with the friction surfaces of the casing, said unit including an annular series of friction shoes, and spring plates connecting adjacent shoes, said plates having their opposite ends imbedded in said adjacent shoes; and spring means within the casing opposing relative movement of said casing and friction unit toward each other.

2. In a shock absorber, the combination with a friction casing having interior, longitudinally extending friction surfaces; of a sectional, expandible friction unit telescoped within the casing and having sliding frictional engagement with the friction surfaces of the casing, said unit including an annular series of friction shoes, and spring plates alternated with said shoes and having their opposite ends imbedded in adjacent shoes; and spring means within the casing opposing relative approach of said casing and friction unit.

3. In a shock absorber, the combination with a cylindrical friction casing having interior, longitudinally extending friction surfaces; of an annular series of friction shoes telescoped within the casing; resilient, bowed spring plates connecting adjacent shoes being anchored at opposite ends to said adjacent shoes and yieldingly spreading the same apart, said shoes having sliding frictional engagement with the interior of the casing; and spring resistance means within the casing yieldingly opposing relative approach of the casing and shoes.

4. In a shock absorber, the combination with a cylindrical friction casing; of an annular series of friction shoes telescoped within the casing and having sliding frictional engagement with the interior of said casing, adjacent shoes having spring seats in the opposed side edges thereof; resilient, bowed spring plates connecting adjacent shoes, said plates having their opposite ends seated in the seats of adjacent shoes; and spring means opposing relative movement of the casing and shoes toward each other.

5. In a shock absorber, the combination with a cylindrical friction casing; of an annular series of friction shoes telescoped within the casing and having sliding frictional engagement with the interior of said casing, adjacent shoes having spring seats in the opposed side edges thereof; resilient, bowed spring plates connecting adjacent shoes, said plates having their opposite ends seated in the seats of adjacent shoes; a spring follower on which said shoes are supported; a spring opposing relative movement of said casing and spring follower toward each other; and a second spring opposing relative movement of said casing and shoes toward each other.

6. In a shock absorber, the combination with a cylindrical friction casing; of an annular series of circumferentially spaced friction shoes telescoped within the casing, said shoes having inturned flanges at their lower ends; resilient, bowed spring plates between adjacent shoes, said plates having their opposite ends anchored respectively to adjacent shoes; a spring within the casing yieldingly opposing relative movement of said casing and shoes toward each other, said spring bearing on the flanges of said shoes; a follower plate upon which the flanged ends of the shoes are supported; and a second spring opposing relative movement of the casing and follower plate toward each other.

ROLAND J. OLANDER.